(12) United States Patent
Noguchi et al.

(10) Patent No.: US 7,349,632 B2
(45) Date of Patent: Mar. 25, 2008

(54) METHOD OF WAVELENGTH SELECTION CONTROL AND WAVELENGTH VARIABLE FILTER DEVICE

(75) Inventors: Masaji Noguchi, Yokohama (JP);
Toshihisa Kyouno, Yokohama (JP);
Tomohiro Ueno, Yokohama (JP);
Hideyuki Miyata, Kawasaki (JP);
Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 454 days.

(21) Appl. No.: 11/143,663

(22) Filed: Jun. 3, 2005

(65) Prior Publication Data
US 2006/0189281 A1   Aug. 24, 2006

(30) Foreign Application Priority Data
Feb. 24, 2005   (JP) .............................. 2005-049089

(51) Int. Cl.
*H04J 9/00* (2006.01)
*H04J 14/02* (2006.01)
*G02B 6/28* (2006.01)

(52) U.S. Cl. .................... 398/95; 398/85; 398/101; 356/512; 385/7; 359/285

(58) Field of Classification Search .................. 398/85, 398/95, 101; 356/512; 385/7; 359/285
See application file for complete search history.

(56) References Cited

U.S. PATENT DOCUMENTS 6,351,323 B1   2/2002   Onaka et al.
6,538,782 B1   3/2003   Otsuka et al.
6,873,795 B1 *   3/2005   Sugaya ........................ 398/34
6,895,141 B2 *   5/2005   Miyata et al. ................. 385/24

FOREIGN PATENT DOCUMENTS

| JP | 11-98122 | 4/1999 |
| JP | 11-218790 | 8/1999 |
| JP | 11-289296 | 10/1999 |
| JP | 2000-241782 | 9/2000 |
| JP | 2003-344817 | 12/2003 |

OTHER PUBLICATIONS

U.S. Appl. No. 09/495,708, filed Feb. 1, 2000, Kai et al.

* cited by examiner

*Primary Examiner*—Shi K. Li
*Assistant Examiner*—Wai Lun Leung
(74) *Attorney, Agent, or Firm*—Staas & Halsey LLP

(57) ABSTRACT

A method of wavelength selection control is disclosed. The method includes detecting reference RF frequencies by varying the frequency of a RF signal supplied to a reference acousto-optic tunable filter with the reference RF frequencies corresponding to reference wavelengths of reference signals input to the tunable filter, performing tracking to optimize the reference RF frequencies, calculating dependent RF frequencies corresponding to wavelengths of WDM transmission signals and recording the calculated dependent RF frequencies in a first register, repeating the above when a request of wavelength selection is not received, when a request of wavelength selection is received, selecting one of the dependent RF frequencies corresponding to the requested wavelength and recording the selected dependent RF frequency in a second register for use of an acousto-optic tunable filter at a port in operation, and generating and supplying a RF signal having the selected dependent RF frequency to the acousto-optic tunable filter.

8 Claims, 11 Drawing Sheets

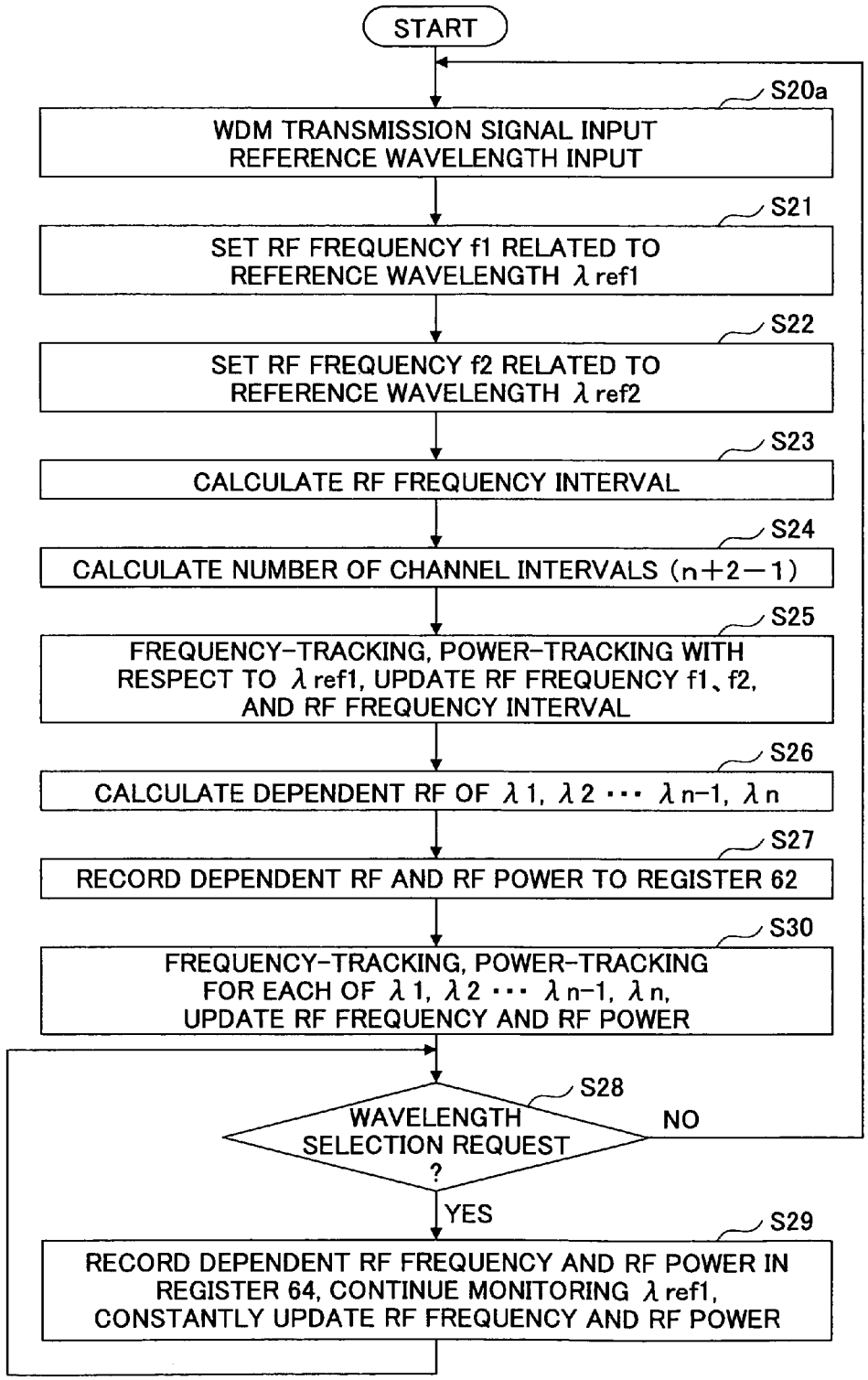

METHOD OF WAVELENGTH SELECTION CONTROL AND WAVELENGTH VARIABLE FILTER DEVICE

BACKGROUND OF THE INVENTION

1. Field of the Invention

The present invention relates to a method of wavelength selection control and a wavelength variable filter device employing the method, particularly, to a method of wavelength selection control for an acousto-optic tunable filter, and a wavelength variable filter device employing the method.

2. Description of the Related Art

Optical communication devices capable of long-distance and large capacity optical communications are required in order to construct future multimedia networks. Among methods for realizing large capacity communications, a Wavelength Division Multiplexing (WDM) transmission scheme is being studied extensively because the WDM scheme is able to efficiently utilize the wide bandwidth and large capacity of optical fibers.

In an optical communication network, it is necessary to provide, at appropriate places in the network, functions of transmitting, dropping, and adding optical signals, and functions of optical routing and optical cross-connect for selecting optical transmission paths. For this purpose, research and development are being made of Optical Add Drop Multiplexer (abbreviated as "OADM", hereinafter) devices for transmitting, dropping, or adding optical signals. The OADM devices include wavelength-fixed OADM devices capable of dropping or adding optical signals having fixed wavelengths and wavelength variable OADM devices capable of dropping or adding optical signals having any wavelength.

Meanwhile, because an acousto-optic tunable filter (abbreviated as "AOTF", hereinafter) is operated to extract a light beam having a wavelength to be selected, the AOTF is able to select wavelengths arbitrarily, while a fiber grating has a fixed wavelength to be selected. In addition, because the AOTF also operates as a filter able to select variable wavelengths, it can be used as a variable wavelength selecting filter in a tributary station for adding or dropping optical signals in a terminal. For this reason, research and development are being made of an OADM device using the AOTF.

In the optical communication network, it is expected that a new optical burst switching transmission scheme will replace an optical stream transmission scheme in the related art. The optical burst switching scheme is proposed because the Internet is a burst network that transmits burst data, and thus the Internet traffic has high statistics. Therefore, by assigning wavelengths only in time periods necessary to burst data transmission and at intervals shorter than milliseconds, an optical transmission network having high network resource utilization can be constructed.

The optical burst switching transmission scheme is able to improve utilization of the network resources. The optical burst switching transmission scheme requires wavelength switching to be executed at an order of milliseconds or less. Because the AOTF is capable of wavelength switching on the order of micro-seconds or less, as it is known, the AOTF can be used as a core device in the optical burst switching transmission scheme.

FIG. 1 is a diagram illustrating a principle of operations of the AOTF.

In FIG. 1, two light guides 1-1, 1-2 are formed by titanium diffusion in a substrate 1-7 made of Lithium Niobate (LiNbO$_3$), which is a ferroelectric crystal and exhibits a piezoelectric effect. The two light guides 1-1, 1-2 intersect at two places, and two light guide-type polarization beam splitters (PBS) 1-3, 1-4 are arranged at the two intersecting portions, respectively.

Between the two intersecting portions, a SAW (Surface Acoustic Wave) guide 1-6 made from a metal is arranged on the two light guides 1-1, 1-2. The SAW guide 1-6 propagates a surface acoustic wave, which is generated when a high frequency signal (160 MHz to 190 MHz) (referred to as a "RF signal" hereinafter) from a RF signal generator 1-10 is applied to an inter-digital transducer (abbreviated to be "IDT" hereinafter).

As illustrated in FIG. 1, light beams which have wavelengths $\lambda 1$, $\lambda 2$, and $\lambda 3$, respectively, and each of which includes mixed polarization modes of a TE mode and a TM mode, are input to a port 1 of the AOTF. The PBS 1-3 splits each of the input light beams into a TE mode light beam and a TM mode light beam, and transmits these light beams to the light guides 1-1, 1-2, respectively.

When a RF signal f1 having a specified frequency is applied, the surface acoustic wave propagates through the SAW guide 1-6. At intersecting portions between the SAW guide 1-6 and the light guides 1-1, 1-2, because of an acousto-optic (AO) effect, the refractive indexes of the light guides 1-1, 1-2 vary periodically.

For this reason, out of the three input light beams, the light beams having specific wavelengths enabling interaction with the periodical variation of the refractive indexes experience rotation of the polarization modes thereof, and due to the rotation, the TE mode and the TM mode are exchanged. The angle through which the polarization mode rotates is proportional to power of the RF signal and an interaction length of the interaction of the TE mode light beam and the TM mode light beam with the periodical variation of the refractive indexes.

The interaction length is adjusted in correspondence to an interval between an absorber 1-8 and an absorber 1-9, which sandwich the IDT 1-5 and absorb the surface acoustic wave appearing on the light guides 1-1, 1-2.

Therefore, by optimizing the power of the RF signal and the interaction length, the TM mode light beam having the specific wavelength is converted to the TE mode light beam in the light guide 1-2, and the TE mode light beam having the specific wavelength is converted to the TM mode light beam in the light guide 1-1. The traveling directions of the thus obtained TE mode light beam and the TM mode light beam are changed by the PBS 1-4. Consequently, the light beam which has the specific wavelength enabling the interaction is selected as a separated light beam and is output from a port 3 of the AOTF. Meanwhile, the light beam which has a wavelength not enabling the interaction just transmits and is output from a port 2 of the AOTF.

In FIG. 1, it is exemplified that due to the RF signal f1, the light beam having the wavelength of $\lambda 1$ is subjected to the interaction and is selected as a separated light beam.

As described above with reference to FIG. 1, the AOTF is able to select and separate a light beam having the wavelength ($\lambda 1$) in correspondence to the frequency of the RF signal, and with the frequency of the RF signal being changed, the AOTF can change the wavelength of the light beam to be selected.

The output light beam from the port 2 corresponds to the light beams input to the port 1 with the light beam ($\lambda 1$) having the wavelength in correspondence to the frequency of the RF signal being removed, that is, the light beam output from the port 2 corresponds to the light beams (λ2) and (λ3). In other words, the AOTF has a rejection capability.

FIG. 2 is a block diagram illustrating an example of a wavelength variable filter in the related art.

FIG. 3 is a block diagram illustrating an example of the register unit 20 of the wavelength variable filter in FIG. 2.

FIG. 4 is a flowchart illustrating operations of wavelength selection in the related art.

Here, it is assumed that WDM transmission signals under consideration have wavelengths of λ1, λ2, . . . , λn−1, λn, respectively, and the wavelengths λ1, λ2, . . . , λn−1, λn are distributed consecutively and at regular intervals.

As illustrated in FIG. 2, a wavelength variable filter 10 includes a 5-channel drop-type integrated AOTF 12, optical taps (optical splitters) 14a through 14e, an optical monitor circuit 16, a controller 18 formed from a digital signal processor (DSP), a register unit 20 formed from a field programmable gate array (FPGA), and a RF signal generation circuit 22.

The WDM transmission signals having wavelengths of λ1, λ2, . . . , λn−1, λn are split by a splitting coupler 24, and are input to ports P1 through P4. A signal having a reference wavelength of λref1 at the minimum wavelength side and a signal having a reference wavelength of λref2 at the maximum wavelength side are input to a port P5 of the AOTF 12. For example, the reference wavelength λref1 may be set to be shorter than the minimum wavelength (λ1) of the WDM transmission signals by a value equivalent to one channel, and the reference wavelength λref2 may be set to be longer than the maximum wavelength (λn) of the WDM transmission signals by a value equivalent to one channel. This is illustrated in step S10 in FIG. 4.

The RF signal generation circuit 22 decreases the frequency of the RF signal supplied to the AOTF at the port P5 from 180 MHz, for example, each time by 1 kHz. The light beam output from the port P5 is split in the optical splitter 14e, and is converted to an electrical signal in the optical monitor circuit 16. The voltage values of the obtained electrical signal are input to the controller 18 as detected values of the reference wavelength λref1, which is the reference wavelength at the minimum wavelength side, and the reference RF frequency f1 when the controller 18 detects a maximum value is set to be in correspondence to the reference wavelength λref1. The obtained reference RF frequency f1 is recorded in a register 20a of the register unit 20, as shown in FIG. 3. This is illustrated in step S11 in FIG. 4.

On the other hand, the RF signal generation circuit 22 increases the frequency of the RF signal supplied to the AOTF at the port 5 from 160 MHz each time by 1 kHz. The light beam output from the port P5 is split in the optical splitter 14e, and is converted to an electrical signal in the optical monitor circuit 16. The voltage values of the obtained electrical signal are input to the controller 18 as detected values of the wavelength λref2, that is, the reference wavelength at the maximum wavelength side, and the reference RF frequency f2 when the controller 18 detects a maximum value is set to be in correspondence to the reference wavelength λref2. The obtained reference wavelength λref2 is recorded in the register 20a of the register unit 20. This is illustrated in step S12 in FIG. 4.

The controller 18 subtracts the reference RF frequency f2 from the reference RF frequency f1 to calculate a RF frequency interval. This is illustrated in step S13 in FIG. 4.

Further, the controller 18 calculates the number of channel intervals (n+1=n+2−1) from the number of channels of the WDM transmission signals (it is n) and the number of the reference wavelengths (it is 2). This is illustrated in step S14 in FIG. 4.

Next, the controller 18 sets the RF signal generation circuit 22 so that a RF signal having the reference RF frequency f1, which corresponds to the reference wavelength λref1 at the minimum wavelength side, is generated and supplied to the ATOF at the port 5.

Without being influenced by variation of the environment temperature or fluctuation of the intensity of the light source having the reference wavelength, the controller 18 performs frequency-tracking and power-tracking to optimize the RF frequency such that the detected value of the RF frequency, that is, the voltage value of the electrical signal generated in the optical monitor circuit 16 by opto-electrical conversion, becomes the maximum. With the optimized RF frequency, the controller 18 updates the reference RF frequency f1 and the corresponding RF power recorded in the register 20a.

The controller 18 updates the reference RF frequency f2 corresponding to the reference wavelength λref2 at the maximum wavelength side by taking into consideration a variation of the reference RF frequency f2 relative to the reference RF frequency f1 corresponding to the reference wavelength λref1 at the minimum wavelength side.

In addition, the controller 18 subtracts the updated reference RF frequency f2 from the updated reference RF frequency f1 to calculate and update the RF frequency interval. This is illustrated in step S15 in FIG. 4.

When the controller 18 receives a request for wavelength selection from a device at an upper level, as illustrated in step S16 in FIG. 4, the controller 18 calculates a dependent RF frequency of the channel to be selected from the RF frequency interval and the number of channel intervals. For example, if the wavelength to be selected by the port P1 is λ2, the controller 18 divides the RF frequency interval by the number of the channel intervals, then the result multiplied by two is subtracted from the reference RF frequency f1 to calculate the RF frequency interval. In this way, the controller 18 obtains the dependent RF frequency of the selected channel λ2. This is illustrated in step S17 in FIG. 4.

The obtained dependent RF frequency and the RF power are recorded in the register 20b, which is used by the port P1, of the register unit 20 shown in FIG. 2 to set RF frequency to be generated by the RF signal generation circuit 22. In this way, the selected channel λ2 is selected at the port P1.

In order that the reference RF frequency be optimized without being influenced by the environment temperature variation, and the intensity fluctuation of the light source having the reference wavelength, the controller 18 performs frequency-tracking and power-tracking at the port P1 such that the voltage value of the electrical signal generated in the optical monitor circuit 16 becomes the maximum. Based on the variation of the optimum RF frequency, the controller 18 updates the reference wavelengths λref1 and λref2 at the minimum side and at the maximum wavelength side, respectively, by taking into consideration relative variations of the reference RF frequencies f1, f2, which correspond to the reference wavelengths λref1 at the minimum wavelength side and the reference wavelength λref2 at the maximum wavelength side, respectively. Further, based on the updated results, the RF frequency interval is also updated. This is illustrated in step S18 in FIG. 4.

For example, the related art of the present technical field is described in the following references.

Japanese Laid Open Patent Application No. 2000-241782 discloses a technique of calculating a wavelength control frequency corresponding to a specified wavelength from the upper and lower reference wavelengths to perform AOTF wavelength control.

Japanese Laid Open Patent Application No. 11-98122 discloses a technique of constantly updating wavelength correction control data to perform wavelength control of a wavelength variable filter.

Japanese Laid Open Patent Application No. 11-289296 discloses a technique of reading out wavelength control data stored beforehand to perform AOTF wavelength control.

Japanese Laid Open Patent Application No. 2003-344817 discloses a device including an AOTF, a RF signal generation circuit, a split light monitor circuit, and a signal processing circuit, wherein the RF signal generation circuit includes a direct digital synthesizer and a frequency multiplication processor.

Japanese Laid Open Patent Application No. 11-218790 discloses a device capable of adding, dropping, and transmitting optical signals having any frequency and any number of multiple codes.

In recent years and continuing, in the field of WDM transmission techniques, the optical burst switching transmission technique is being studied in order to achieve efficient optical stream data transmission. In optical burst switching transmission, it is required to perform high speed wavelength switching at a time period shorter than 50 µs. For this purpose, an AOTF device capable of fast operations is being studied.

However, in the related art as illustrated in FIG. 2 through FIG. 4, in order to calculate a correspondence relation between a wavelength and a RF frequency or RF power, each time wavelength selection is to be performed, the controller 18 needs to analyze a wavelength selection request, perform calculations, access the register unit 20, and perform frequency-tracking and power-tracking for the reference RF. Due to this, the operation of wavelength selection and switching costs about 2 ms, and it is difficult to realize high speed optical wavelength switching.

SUMMARY OF THE INVENTION

It is a general object of the present invention to solve one or more of the problems of the related art.

It is a more specific object of the present invention to provide a wavelength selection control method capable of high speed optical wavelength selection and switching, and a wavelength variable filter device using the method.

According to a first aspect of the present invention, there is provided a wavelength selection control method, comprising the steps of detecting a plurality of reference RF frequencies by varying a frequency of a RF signal supplied to a reference acousto-optic tunable filter, a plurality of reference signals having respective reference wavelengths being input to said reference acousto-optic tunable filter, said reference RF frequencies being in correspondence to the reference wavelengths; performing tracking to optimize the reference RF frequencies; calculating, from the reference RF frequencies, a plurality of dependent RF frequencies corresponding to wavelengths of a plurality of WDM transmission signals, and recording the calculated dependent RF frequencies in a first register; repeating the step of detecting, the step of performing tracking, and the step of calculating and recording when a request for wavelength selection is not received; selecting, from the first register, one of the dependent RF frequencies in correspondence to a requested wavelength, and recording the selected dependent RF frequency in a second register when a request of wavelength selection is received, said second register being used for an acousto-optic tunable filter at a port in operation, the WDM transmission signals being supplied to said port in operation; and generating a RF signal having the selected dependent RF frequency recorded in the second register, and supplying the RF signal having the selected dependent RF frequency to the acousto-optic tunable filter at the port in operation.

As an embodiment, the WDM transmission signals and the reference signals are combined and supplied to the reference acousto-optic tunable filter; and in the step of performing tracking, the reference RF frequencies and the dependent RF frequencies are optimized.

As an embodiment, the reference wavelengths include a first reference wavelength that is shorter than the shortest one of the wavelengths of the WDM transmission signals by a quantity equivalent to one channel; and a second reference wavelength that is longer than the longest one of the wavelengths of the WDM transmission signals by a quantity equivalent to one channel.

According to the above invention, it is possible to perform high speed wavelength selection and switching. In addition, it is possible to perform optimized and precise wavelength selection.

According to a second aspect of the present invention, there is provided a wavelength variable filter device, comprising: a reference RF frequency detection unit that detects a plurality of reference RF frequencies by varying a frequency of a RF signal supplied to a reference acousto-optic tunable filter, a plurality of reference signals having respective reference wavelengths being input to said reference acousto-optic tunable filter, said reference RF frequencies being in correspondence to the reference wavelengths; a tracking unit that performs tracking to optimize the reference RF frequencies; a first register recording unit that calculates a plurality of dependent RF frequencies corresponding to wavelengths of a plurality of WDM transmission signals from the reference RF frequencies, and recording the calculated dependent RF frequencies in a first register; a repeating unit that repeats detection of the reference RF frequencies, tracking, and calculation and recording of the dependent RF frequencies when a request for wavelength selection is not received; and a second register recording unit that selects, from the first register, one of the dependent RF frequencies in correspondence to a requested wavelength, and records the selected dependent RF frequency in a second register when a request of wavelength selection is received, said second register being used for an acousto-optic tunable filter at a port in operation, the WDM transmission signals being supplied to said port in operation; wherein a RF signal having the selected dependent RF frequency recorded in the second register is generated and supplied to the acousto-optic tunable filter at the port in operation.

As an embodiment, the wavelength variable filter device further comprises a combining unit that combines the WDM transmission signals and the reference signals and supplies the combined signal to the reference acousto-optic tunable filter, wherein the tracking unit optimizes the reference RF frequencies and the dependent RF frequencies.

As an embodiment, the tracking unit optimizes the reference RF frequencies and RF power levels related to the reference RF frequencies, respectively. Further, as an embodiment, the tracking unit optimizes the reference RF frequencies and RF power levels related to the respective reference RF frequencies, and the dependent RF frequencies and RF power levels related to the dependent RF frequencies.

As an embodiment, the reference wavelengths include a first reference wavelength that is shorter than the shortest one of the wavelengths of the WDM transmission signals by a quantity equivalent to one channel; and a second reference wavelength that is longer than the longest one of the wavelengths of the WDM transmission signals by a quantity equivalent to one channel.

According to the above invention, it is possible to perform high speed wavelength selection and switching. In addition, it is possible to perform optimized and precise wavelength selection.

These and other objects, features, and advantages of the present invention will become more apparent from the following detailed description of the preferred embodiments given with reference to the accompanying drawings.

BRIEF DESCRIPTION OF THE DRAWINGS

FIG. 11 is a flowchart illustrating operations of wavelength selection according to the second embodiment of the present invention.

DESCRIPTION OF THE PREFERRED EMBODIMENTS

Below, preferred embodiments of the present invention are explained with reference to the accompanying drawings.

First Embodiment

Figure 5:
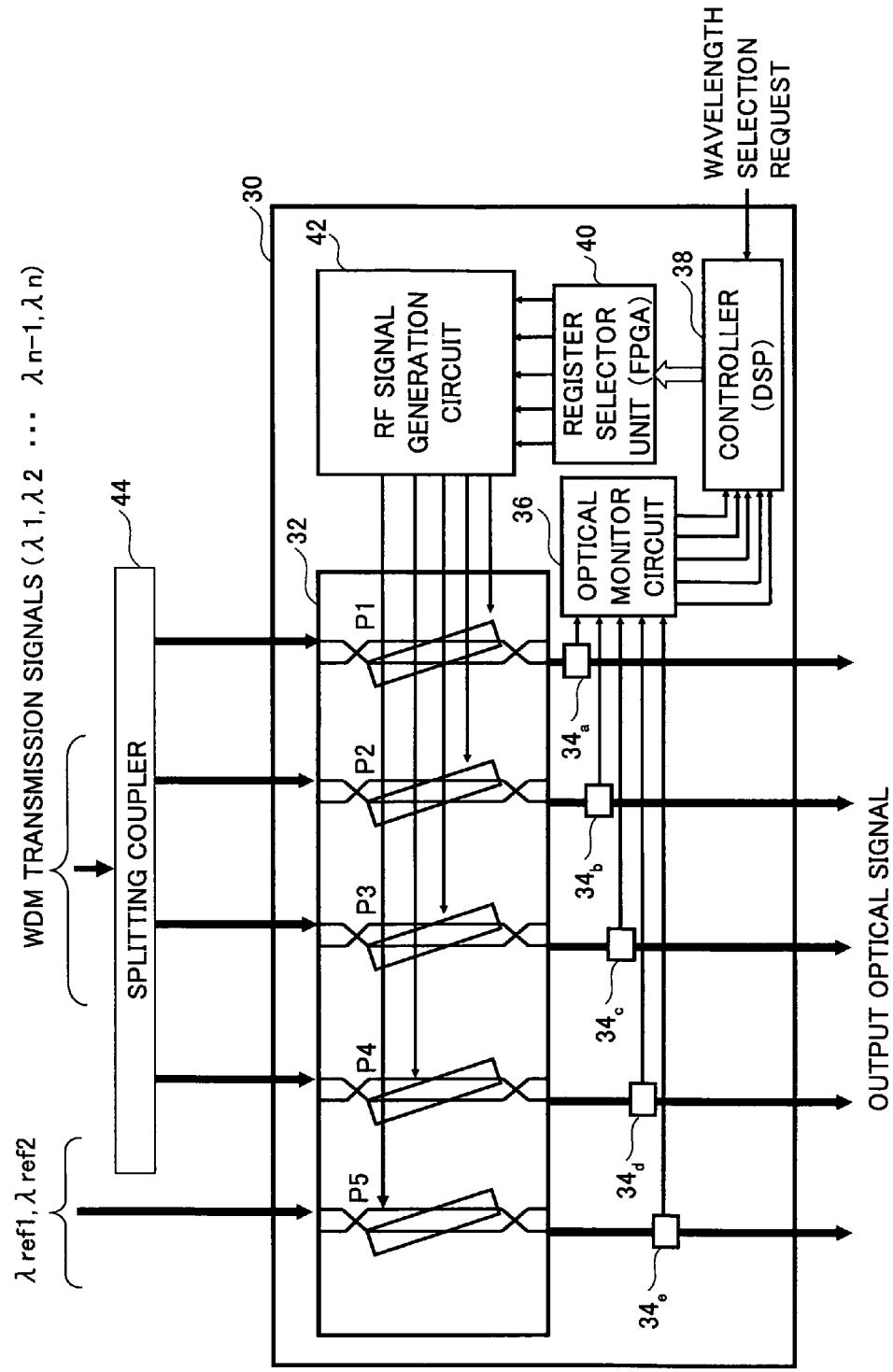
FIG. 5 is a block diagram illustrating an example of a wavelength variable filter according to a first embodiment of the present invention.

FIG. 5 is a block diagram illustrating an example of a wavelength variable filter according to a first embodiment of the present invention.

Here, it is assumed that WDM transmission signals under consideration have wavelengths of $\lambda 1, \lambda 2, \ldots, \lambda n-1, \lambda n$, respectively, and the wavelengths $\lambda 1, \lambda 2, \ldots, \lambda n-1, \lambda n$ distribute consecutively and at regular intervals.

As illustrated in FIG. 5, a wavelength variable filter 30 includes a 5-channel drop-type integrated AOTF 32, optical taps (optical splitters) 34a through 34e, an optical monitor circuit 36, a controller 38 formed from a digital signal processor (DSP), a register-selector unit 40 formed from a field programmable gate array (FPGA), and a RF signal generation circuit 42.

Figure 1:
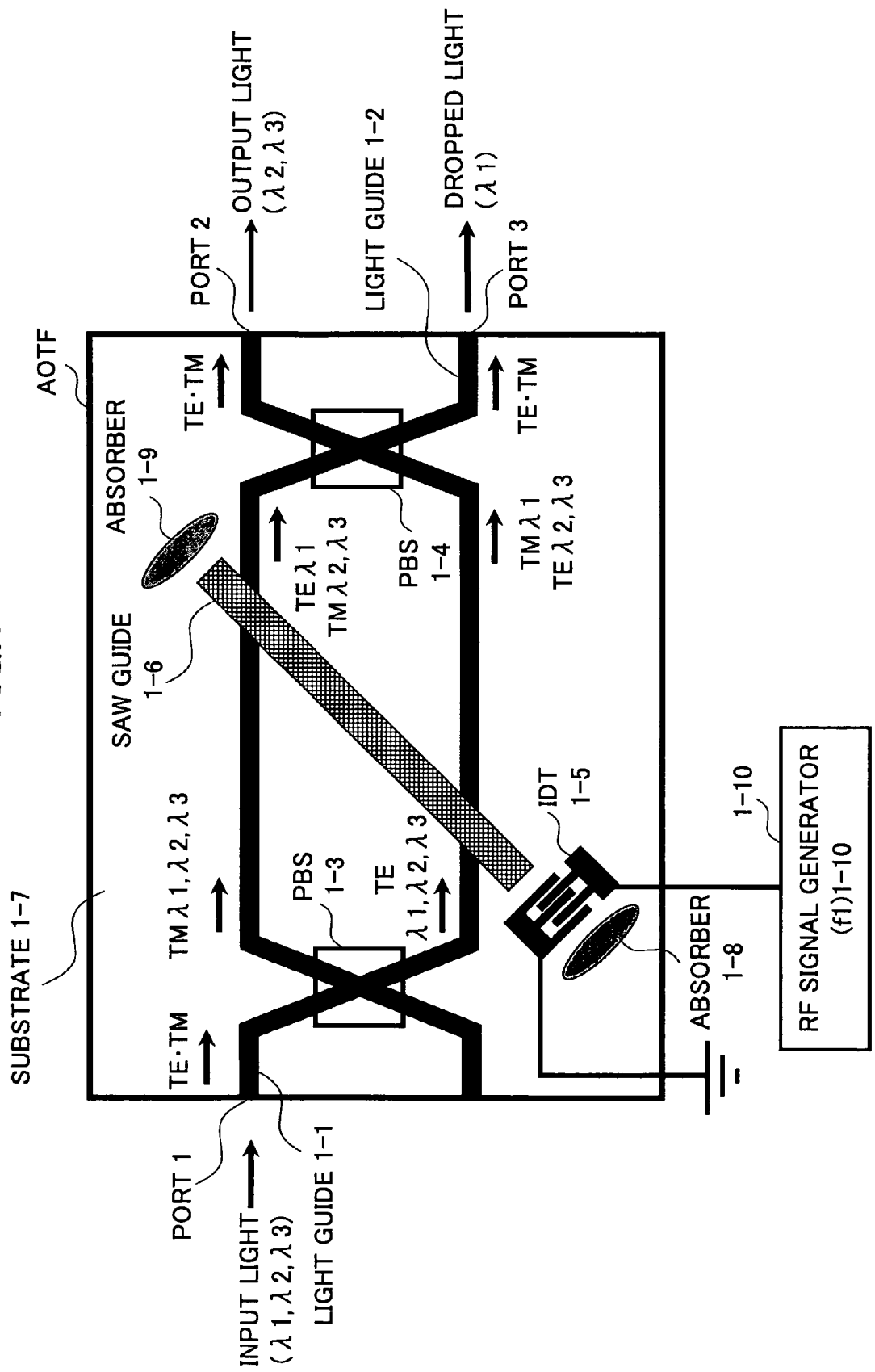
FIG. 1 is a diagram illustrating a principle of operations of the AOTF in the related art.
Figure 2:
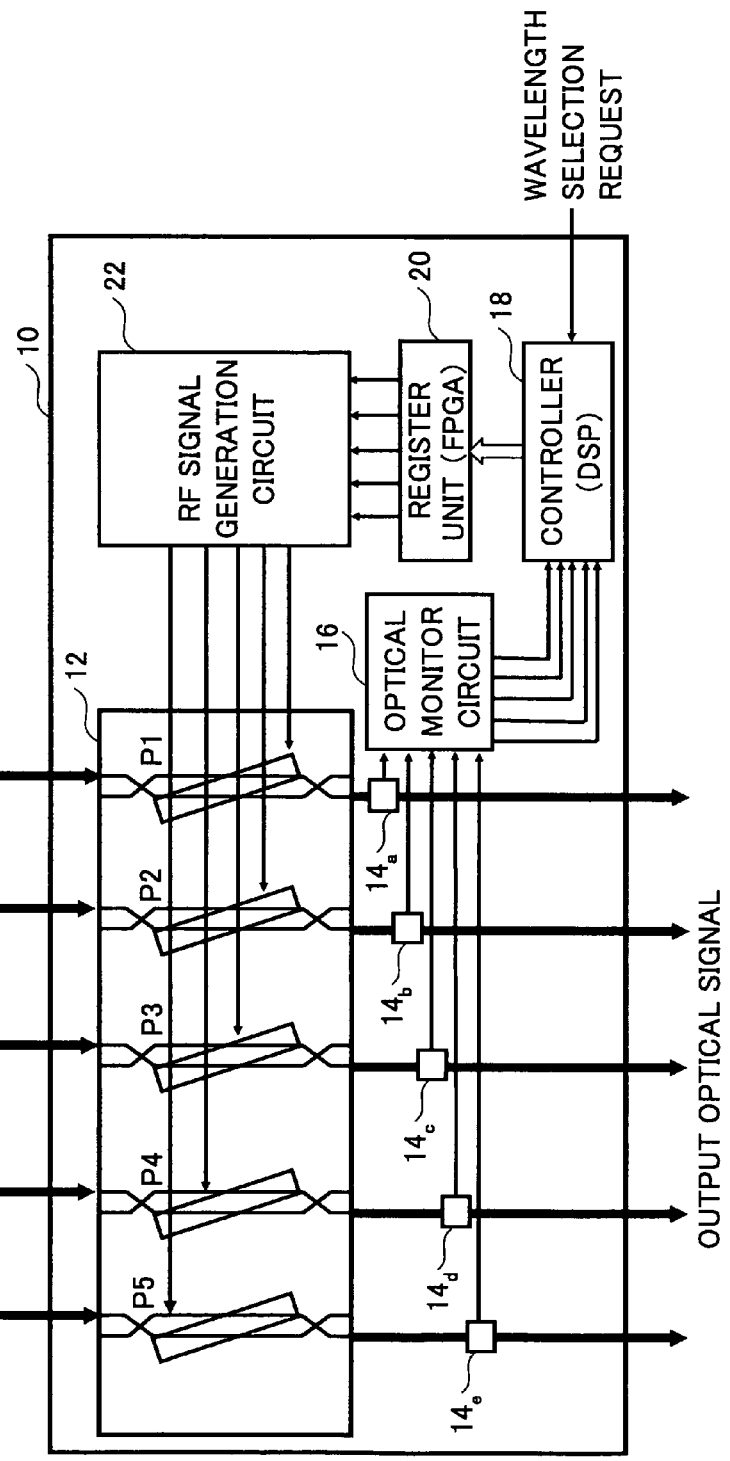
FIG. 2 is a block diagram illustrating an example of a wavelength variable filter in the related art.
Figure 3:
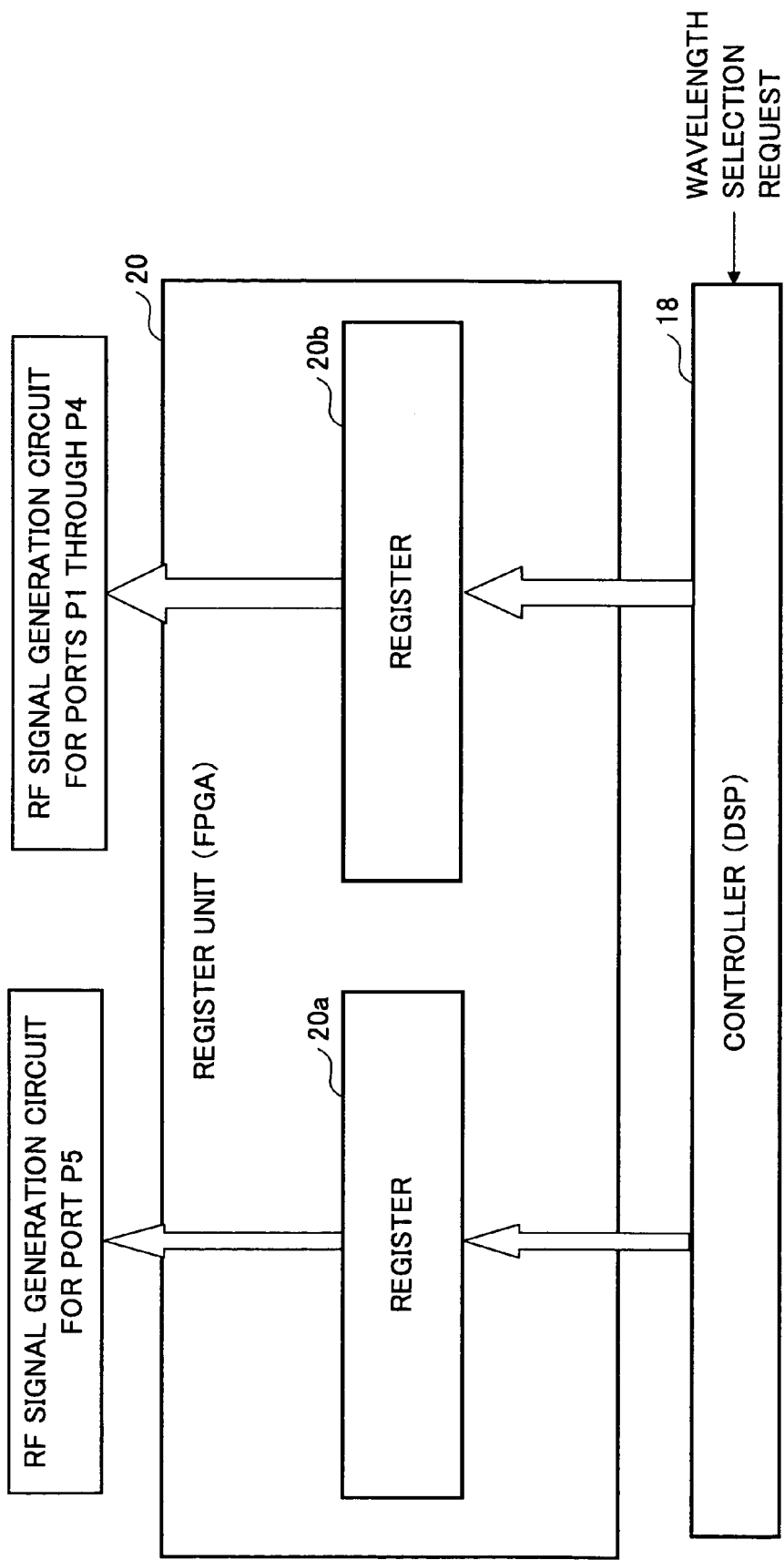
FIG. 3 is a block diagram illustrating an example of the register unit 20 of the wavelength variable filter in FIG. 2.
Figure 4:
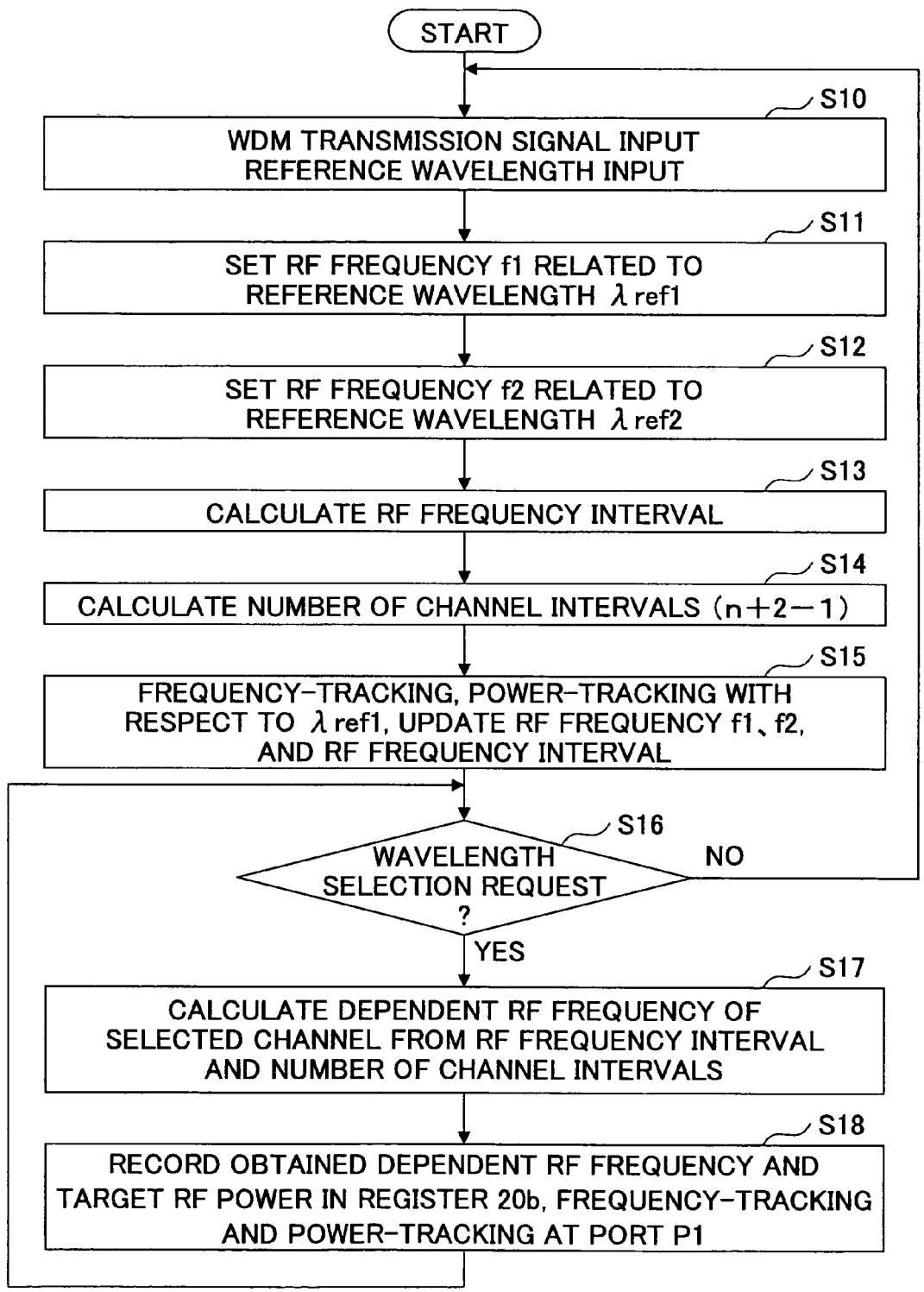
FIG. 4 is a flowchart illustrating operations of wavelength selection in the related art.

The 5-channel drop-type integrated AOTF 32 includes 5 AOTFs as illustrated in FIG. 1. That is, WDM transmission signals have wavelengths of $\lambda 1, \lambda 2, \ldots, \lambda n-1, \lambda n$, which are split at a splitting coupler 44, are input to the ports P1 through P4, and a signal having a reference wavelength of $\lambda ref1$ and a signal having a reference wavelength of $\lambda ref2$ are input to the port P5. At each port, an optical signal having a specified wavelength in correspondence to a RF frequency is dropped, that is, this optical signal is selected and output.

The optical signals dropped respectively at ports P1 through P4 of the AOTF 32 are partially split at the optical taps 34a through 34d, and are sent to the optical monitor circuit 36.

The optical monitor circuit 36 converts the optical signals from the ports P1 through P4 into electrical signals, and outputs the obtained voltage signal to the controller 38.

Figure 6:
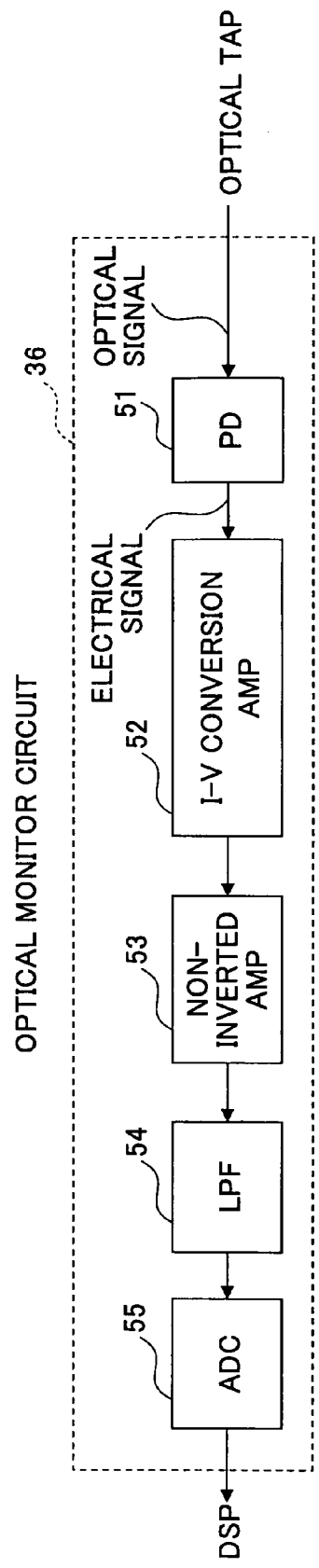
FIG. 6 is a block diagram illustrating a portion of the optical monitor circuit 36 for one port, in the wavelength variable filter in FIG. 5.

FIG. 6 is a block diagram illustrating a portion of the optical monitor circuit 36, for one port, in the wavelength variable filter in FIG. 5.

As illustrated in FIG. 6, the optical signal split at one of the optical taps 34a through 34d is sent to a photo diode (PD) 51. The photo diode 51 converts the optical signal into a current signal, and a current-voltage conversion log amplifier (I-V conversion AMP) 52 converts the current signal to a voltage signal. A non-inverted amplifier (non-inverted AMP) 54 amplifies the voltage signal, a low-pass filter (LPF) removes unnecessary high frequency components from the voltage signal, the resulting signal is converted into a digital signal, and is sent to the controller 38.

In response to the monitor values (voltage values) given by the optical monitor circuit 36 of the output optical signals from the respective ports P1 through P4, the controller 38 determines reference RF frequencies f1, f2 and RF power levels thereof corresponding to the reference wavelengths $\lambda ref1, \lambda ref2$, and dependent RF frequencies and RF power levels thereof corresponding to the respective wavelengths of $\lambda 1, \lambda 2, \ldots, \lambda n-1, \lambda n$ of the WDM transmission signals. Then, the controller 38 records the determined reference RF frequencies f1, f2 and the RF power levels thereof, and the determined dependent RF frequencies and the RF power levels are loaded into registers of the register-selector unit 40 as shown in FIG. 5.

Figure 7:
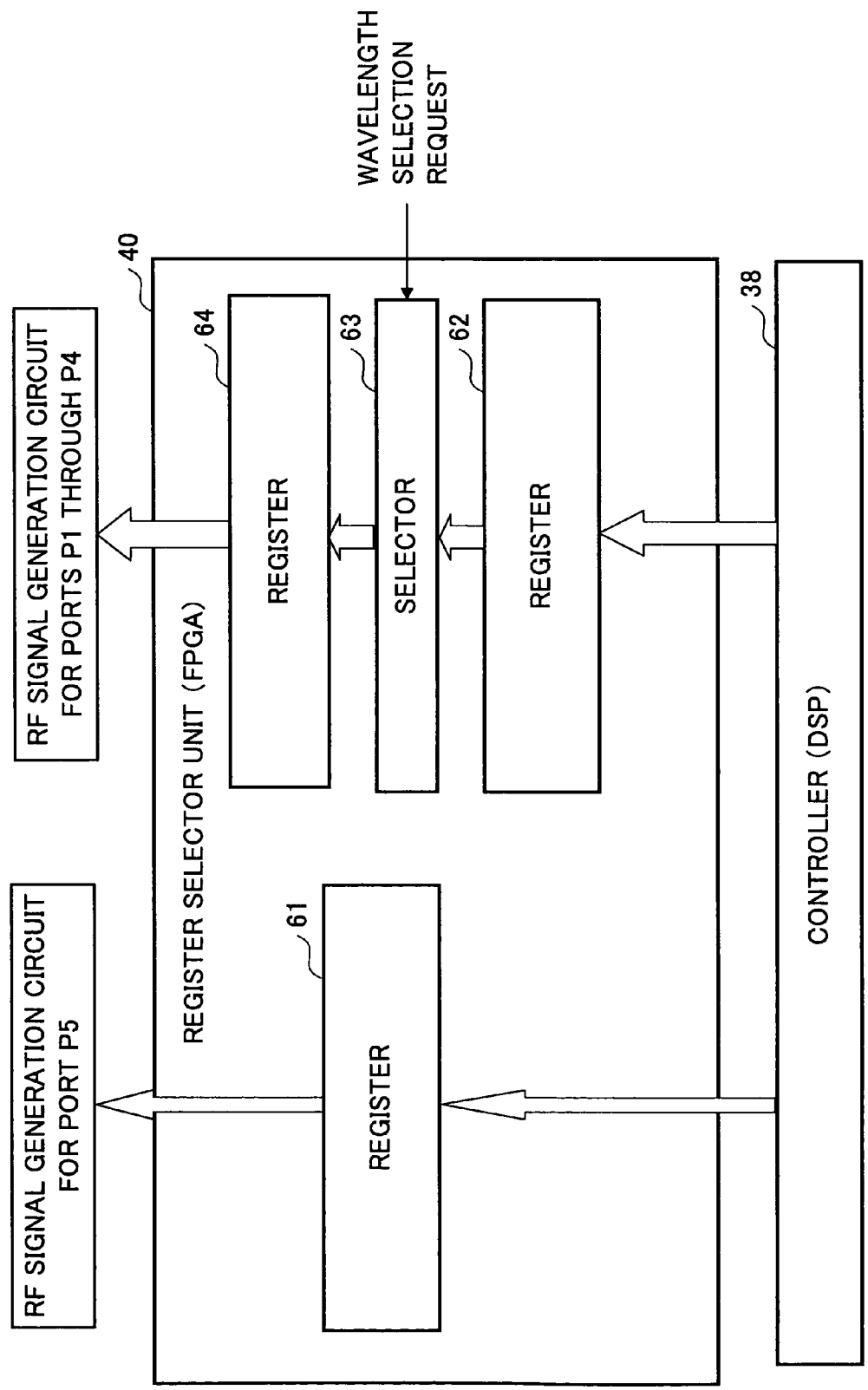
FIG. 7 is a block diagram illustrating an example of the register-selector unit 40 in the wavelength variable filter in FIG. 5.

FIG. 7 is a block diagram illustrating an example of the register-selector unit 40 of the wavelength variable filter in FIG. 5.

When the register-selector unit 40 receives a request of wavelength selection from a device at an upper level, the register-selector unit 40 selects the dependent RF frequency and the RF power level corresponding to the wavelength requested in the wavelength selection request, and supplies the selected dependent RF frequency and RF power level to the RF signal generation circuit 42.

In FIG. 7, it is exemplified that the reference RF frequencies f1, f2 for use of the port P5 and the corresponding RF power levels are recorded in a register 61 by the controller 38, and are supplied to the RF signal generation circuit 42.

In addition, the dependent RF frequencies and RF power levels thereof corresponding to the respective wavelengths of λ1, λ2, ..., λn−1, λn of the WDM transmission signals are recorded in a register 62 by the controller 38, and are supplied to a selector 63.

When the selector 63 receives a request for wavelength selection from the upper level device, the selector 63 selects a dependent RF frequency and the relevant RF power level corresponding to the requested wavelength from the dependent RF frequencies and the RF power levels corresponding to the wavelengths of λ1, λ2, ..., λn−1, λn recorded in the register 62, and outputs the selected dependent RF frequency and RF power level to a register 64.

The register 64 is for storing the dependent RF frequencies and RF power levels for use of the ports P1 through P4. In response to request, the dependent RF frequency and the RF power level from the selector 63 is set for use of one of the ports P1 through P4.

Figure 8:
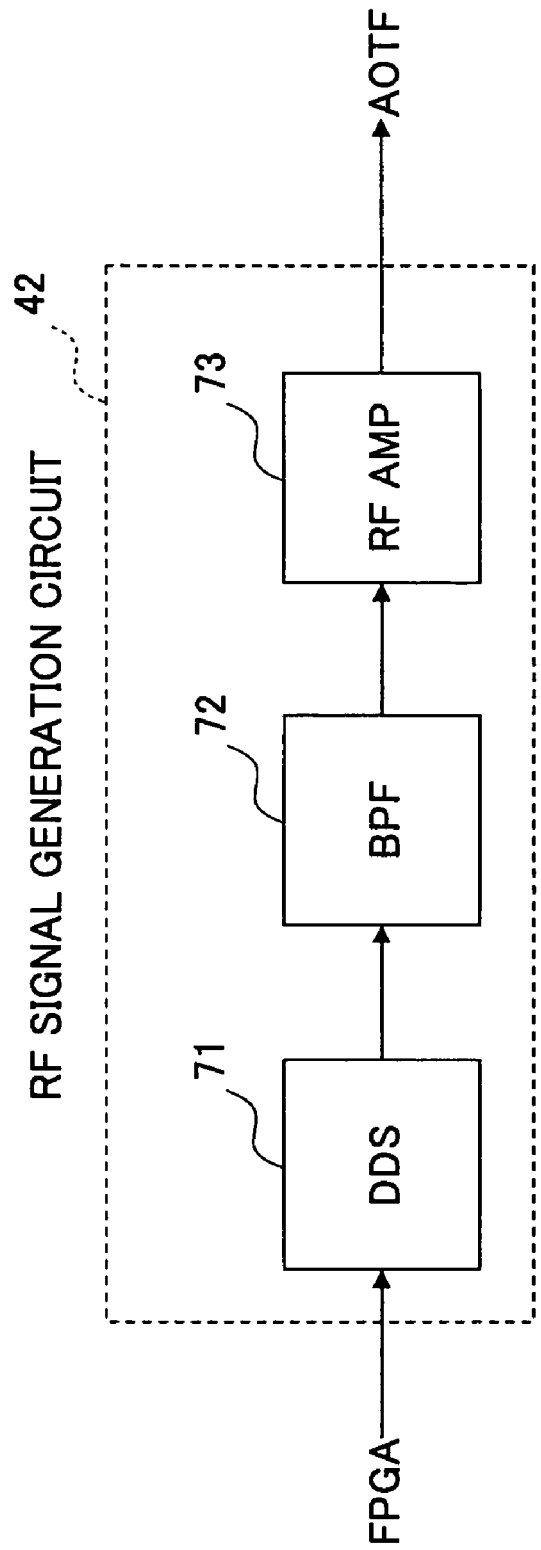
FIG. 8 is a block diagram illustrating a portion of the RF signal generation circuit 42 for one port in the wavelength variable filter in FIG. 5.

FIG. 8 is a block diagram illustrating a portion of the RF signal generation circuit 42 for one port in the wavelength variable filter in FIG. 5.

The RF signal generation circuit 42 generates RF signals having the dependent RF frequencies for use of the ports P1 through P4, and RF signals having the reference RF frequencies f1, f2 for use of the port P5, and supplies the RF signals to the ports P1 through P5 of the AOTF 32.

As illustrated in FIG. 8, RF signals having the dependent RF frequencies and RF signals having the reference RF frequencies f1, f2 from the register-selector unit 40 are supplied to a direct digital synthesizer (DDS) 71, RF signals having the desired frequencies and power levels are generated, and are supplied to a band-pass filter 72.

The band-pass filter 72 removes unnecessary frequency components from the RF signals, and outputs the resulting RF signals to a RF amplifier (AMP).

The RF amplifier 73 amplifies the input RF signals in response to the RF power levels output from the register-selector unit 40, and outputs the RF signals to the AOTF 32.

Figure 9:
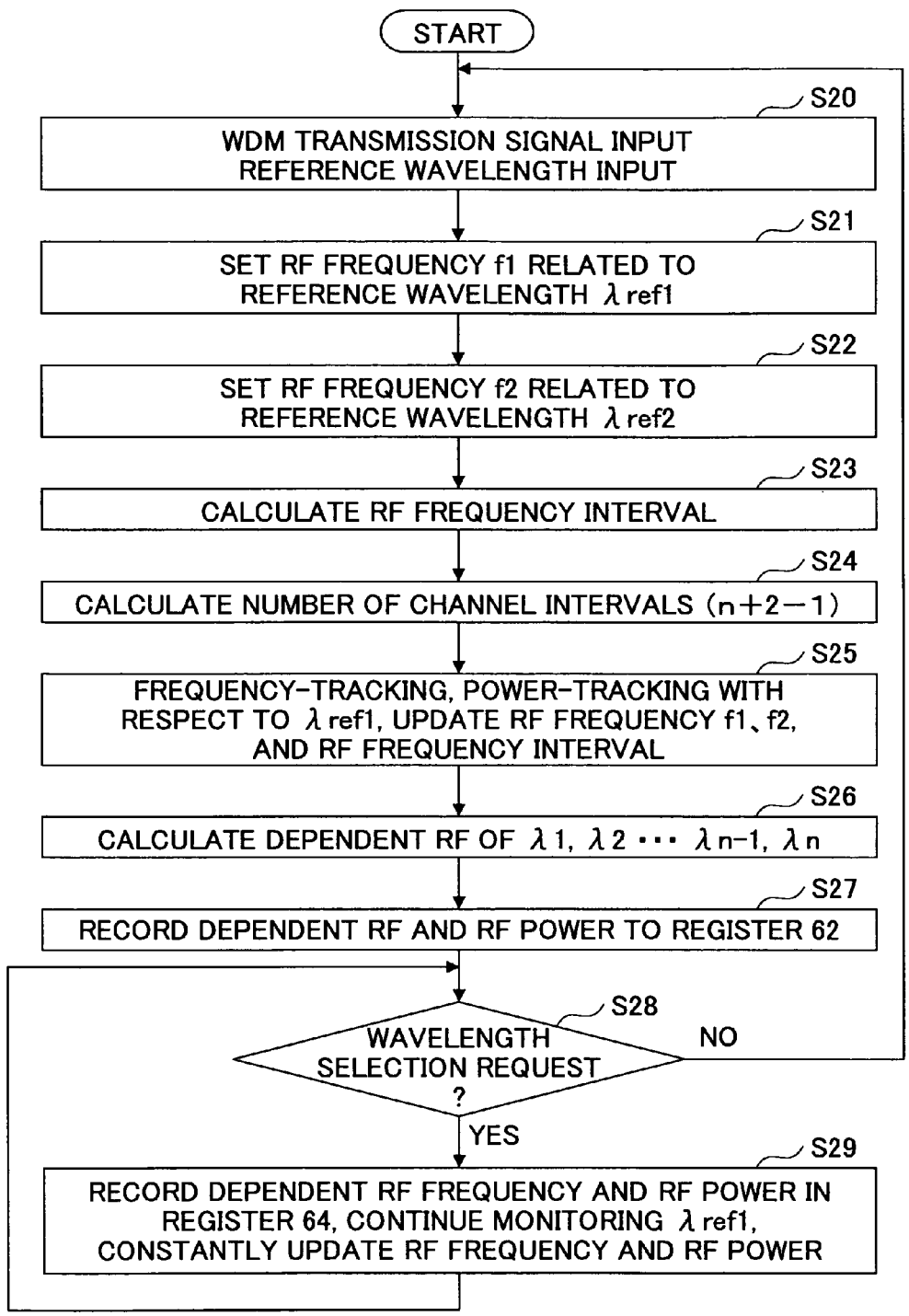
FIG. 9 is a flowchart illustrating operations of wavelength selection according to the first embodiment of the present invention.

FIG. 9 is a flowchart illustrating operations of wavelength selection according to the first embodiment of the present invention.

In step S20, the WDM transmission signals having the wavelengths of λ1, λ2, ..., λn−1, λn are split by the splitting coupler 44, and are input to the ports P1 through P4 of the AOTF 32.

A signal having a reference wavelength of λref1 at the minimum wavelength side and a signal having a reference wavelength of λref2 at the maximum wavelength side are input to the port P5 of the AOTF 32. For example, the reference wavelength λref1 may be set to be shorter than the minimum wavelength (λ1) of the WDM transmission signals by a value equivalent to one channel, and the reference wavelength λref2 may be set to be longer than the maximum wavelength (λn) of the WDM transmission signals by a value equivalent to one channel.

In step S21, the RF signal generation circuit 42 decreases the frequency of the RF signal supplied to the AOTF at the port 5 from 180 MHz, for example, each time by 1 kHz. The light beam output from the port P5 is split in the optical splitter 34e, and is converted into the voltage signal in the optical monitor circuit 36. The voltage values of the electrical signal are input to the controller 38 as detected values of the wavelength λref1, which is the reference wavelength at the minimum wavelength side. The controller 38 sets the reference RF frequency f1 when the controller 18 detects a maximum value to be in correspondence to the reference wavelength λref1, and records the reference RF frequency f1 in the register 61 for use of the port 5 in the register-selector unit 40.

In step S22, the RF signal generation circuit 42 increases the frequency of the RF signal supplied to the AOTF at the port 5 from 160 MHz, for example, each time by 1 kHz. The light beam output from the port P5 is split in the optical splitter 35e, and is converted to a voltage signal in the optical monitor circuit 36. The voltage values of the voltage signal are input to the controller 38 as a detected value of the reference wavelength λref2, which is the reference wavelength at the maximum wavelength side, and the reference RF frequency f2 when the controller 38 detects a maximum value is set to be in correspondence to the reference wavelength λref2, and records the reference RF frequency f2 in the register 61 for use of the port 5 in the register-selector unit 40.

In step S23, the controller 38 subtracts the reference RF frequency f2 from the reference RF frequency f1 to calculate a RF frequency interval.

In step S24, the controller 38 calculates the number of channel intervals (n+1=n+2−1) from the number of channels of the WDM transmission signals (it is n) and the number of the reference wavelengths (it is 2).

In step S25, the controller 38 sets the RF signal generation circuit 42 so that the RF signal generation circuit 42 generates a RF signal having the reference RF frequency f1, which corresponds to the reference wavelength λref1 at the minimum wavelength side, and supplies the RF signal to the ATOF at the port 5.

Without being influenced by variation of the environment temperature or fluctuation of the intensity of the light source having the reference wavelength, the controller 38 performs frequency-tracking and power-tracking to optimize the RF frequency such that the detected value of the RF frequency, that is, the voltage value of the electrical signal generated in the optical monitor circuit 36 by opto-electrical conversion, becomes the maximum. With the optimized RF frequency, the controller 38 updates the reference RF frequency f1 and the corresponding RF power to be recorded in the register 61.

The controller 38 also updates the reference RF frequency f2 corresponding to the reference wavelength λref2 at the maximum wavelength side by taking into consideration a variation of the reference RF frequency f2 relative to the reference RF frequency f1 corresponding to the reference wavelength λref1 at the minimum wavelength side.

In addition, the controller 38 subtracts the updated reference RF frequency f2 from the updated reference RF frequency f1 to calculate and update the RF frequency interval.

It should be noted the reference RF frequency f2 corresponding to the reference wavelength λref2 at the maximum wavelength side may also be calculated in the same way as the reference RF frequency f1 corresponding to the reference wavelength λref1 at the minimum wavelength side, instead of being deduced from the reference RF frequency f1.

In step S26, the controller 38 calculates respective dependent RF frequencies of all wavelengths of λ1, λ2, ..., λn−1, λn from the RF frequency interval and the number of channel intervals.

In step S27, the controller 38 records the dependent RF frequencies in the register 62 in the register-selector unit 40.

The RF power levels obtained in the power tracking process are used in this step.

In step S28, the controller 38 determines whether a request for wavelength selection is received.

When a request of wavelength selection is not received, step S20 through step S27 are repeated.

When a request of wavelength selection is received from a device at an upper level, which includes the wavelength and port to be selected, in step S29, out of the dependent RF frequencies of the wavelengths of λ1, λ2, . . . , λn−1, λn and the RF power levels recorded in the register 62, the selector 63 in the register-selector unit 40 selects one dependent RF frequency, and the RF power level, in correspondence to the requested wavelength specified in the wavelength selection request, and records the selected dependent RF frequency and the RF power level in the register 64, which is used for the port specified in the wavelength selection request.

Hence, in response to the wavelength selection request, for example, a channel corresponding to the wavelength λ2 is selected.

Then, the controller 38 sets the RF signal generation circuit 42 so that the RF signal generation circuit 42 generates a RF signal having the reference RF frequency f1, which corresponds to the reference wavelength λref1 at the minimum wavelength side, and supplies the RF signal to the ATOF at the port 5.

Without being influenced by variation of the environment temperature or fluctuation of the intensity of the light source having the reference wavelengths, the controller 38 performs frequency-tracking and power-tracking to optimize the RF frequency such that the detected value of the RF frequency, that is, the voltage value of the electrical signal generated in the optical monitor circuit 36 by opto-electrical conversion, becomes the maximum. With the optimized RF frequency, the controller 38 updates the reference RF frequency f1 and the corresponding RF power to be recorded in the register 61.

In this way, the controller 38 constantly calculates the dependent RF frequencies of the wavelengths of λ1, λ2, . . . , λn−1, λn of the WDM transmission signals and the RF power levels, records these data in the register 62, and when a request of wavelength selection is received, the selector 63 moves the selected dependent RF frequency and the RF power level from the register 62 to the register 64 for use of the ports P1 through P4.

Thus, because the selected dependent RF frequency and the RF power level are recorded in the RF signal generation circuits 42 used by the AOTFs in operations (that is, at the ports P1 through P4), when a request of wavelength selection is received, operations of the controller 38 are not required; therefore, it is possible to increase the operation speed. For example, a high operation speed less than 20 us can be realized. In addition, it is possible to follow the variation of the environmental temperature.

As a result, the wavelength variable filter can be used as an optical switch in optical burst switching transmission, enabling efficient wavelength utilization in the optical burst switching transmission.

Second Embodiment

Figure 10:
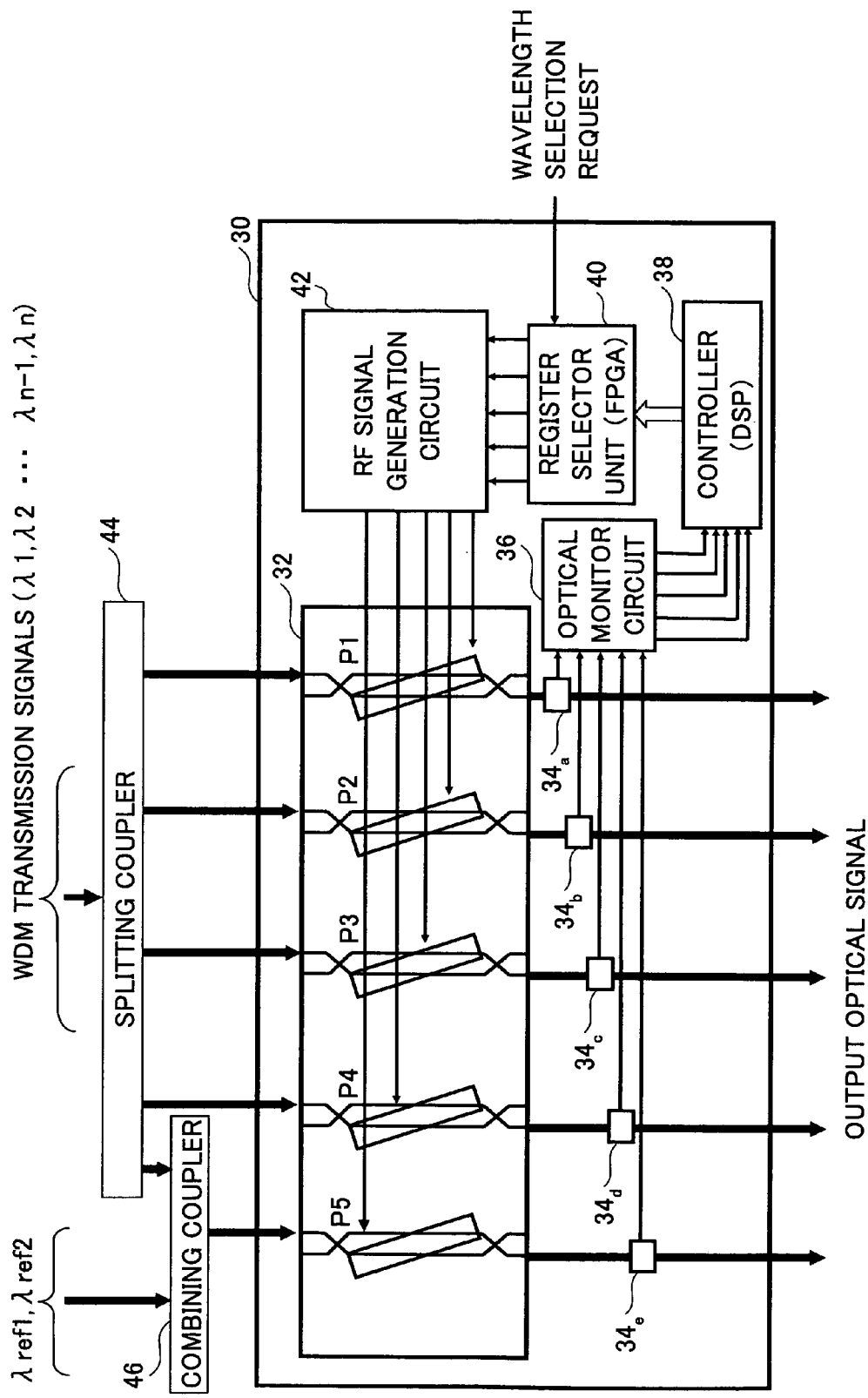
FIG. 10 is a block diagram illustrating an example of a wavelength variable filter according to a second embodiment of the present invention.

FIG. 10 is a block diagram illustrating an example of a wavelength variable filter according to a second embodiment of the present invention.

In FIG. 10, the same reference numbers are assigned to the same elements as those in FIG. 5.

In FIG. 5, a signal having a reference wavelength of λref1 and a signal having a reference wavelength of λref2 are input to the port P5 of the 5-channel drop-type integrated AOTF 32.

In contrast, in the present embodiment as illustrated in FIG. 10, the WDM transmission signals, which have the wavelengths of λ1, λ2, . . . , n−1, λn and are split in the splitting coupler 44, are input to a combining coupler 46, and the combining coupler 46 combines the WDM transmission signals having the wavelengths of λ1, λ2, . . . , λn−1, λn with the signal having the reference wavelength λref1 and the signal having the reference wavelength of λref2, and the combined signal is input to the port P5 of the 5-channel drop-type integrated AOTF 32.

FIG. 11 is a flowchart illustrating operations of wavelength selection according to the second embodiment of the present invention.

In FIG. 11, the same reference numbers are assigned to the same steps as those in FIG. 9.

In step S20a, the WDM transmission signals having the wavelengths of λ1, λ2, . . . , λn−1, λn are split in the splitting coupler 44, and are input to the ports P1 through P4 of the AOTF 32.

The WDM transmission signals having the wavelengths of λ1, λ2, . . . , λn−1, An split in the splitting coupler 44 are input to the combining coupler 46.

A signal having a reference wavelength of λref1 at the minimum wavelength side and a signal having a reference wavelength of λref2 at the maximum wavelength side are input to the combining coupler 46.

The combining coupler 46 combines the WDM transmission signals having the wavelengths of λ1, λ2, . . . , λn−1, λn with the signal having the reference wavelength λref1 and the signal having the reference wavelength of λref2, and outputs the combined signal to the port P5 of the AOTF 32.

For example, the reference wavelength λref1 may be set to be shorter than the minimum wavelength (λ1) of the WDM transmission signals by a value equivalent to one channel, and the reference wavelength λref2 may be set to be longer than the maximum wavelength (λn) of the WDM transmission signals by a value equivalent to one channel.

In step S21, the RF signal generation circuit 42 decreases the frequency of the RF signal supplied to the AOTF at the port 5 from 180 MHz, for example, each time by 1 kHz. The light beam output from the port P5 is split in the optical splitter 34e, and is converted into the voltage signal in the optical monitor circuit 36. The voltage values of the electrical signal are input to the controller 38 as detected values of the wavelength λref1, which is the reference wavelength at the minimum wavelength side. The controller 38 sets the reference RF frequency f1 when the controller 18 detects a maximum value to be in correspondence to the reference wavelength λref1, and records the reference RF frequency f1 in the register 61 for use of the port 5 in the register-selector unit 40.

In step S22, the RF signal generation circuit 42 increases the frequency of the RF signal supplied to the AOTF at the port 5 from 160 MHz, for example, each time by 1 kHz. The light beam output from the port P5 is split in the optical splitter 35e, and is converted to a voltage signal in the optical monitor circuit 36. The voltage value of the voltage signal are input to the controller 38 as a detected value of the reference wavelength λref2, which is the reference wavelength at the maximum wavelength side, and the reference RF frequency f2 when the controller 38 detects a maximum value is set to be in correspondence to the reference wavelength λref2, and records the reference RF frequency f2 in the register 61 for use of the port 5 in the register-selector unit 40.

In step S23, the controller 38 subtracts the reference RF frequency f2 from the reference RF frequency f1 to calculate a RF frequency interval.

In step S24, the controller 38 calculates the number of channel intervals (n+1=n+2−1) from the number of channels of the WDM transmission signals (it is n) and the number of the reference wavelengths (it is 2).

In step S25, the controller 38 sets the RF signal generation circuit 42 so that the RF signal generation circuit 42 generates a RF signal having the reference RF frequency f1, which corresponds to the reference wavelength λref1 at the minimum wavelength side, and supplies the RF signal to the ATOF at the port 5.

Without being influenced by variation of the environment temperature or fluctuation of the intensity of the light source having the reference wavelength, the controller 38 performs frequency-tracking and power-tracking to optimize the RF frequency such that the detected value of the RF frequency, that is, the voltage value of the electrical signal generated in the optical monitor circuit 36 by opto-electrical conversion, becomes the maximum. With the optimized RF frequency, the controller 38 updates the reference RF frequency f1 and the corresponding RF power to be recorded in the register 61.

The controller 38 also updates the reference RF frequency f2 corresponding to the reference wavelength λref2 at the maximum wavelength side by taking into consideration a variation of the reference RF frequency f2 relative to the reference RF frequency f1 corresponding to the reference wavelength λref1 at the minimum wavelength side.

The controller 38 subtracts the updated reference RF frequency f2 from the updated reference RF frequency f1 to calculate and update the RF frequency interval.

In step S26, the controller 38 calculates respective dependent RF frequencies of all wavelengths of λ1, λ2, ..., λn−1, λn from the RF frequency interval and the number of channel intervals.

In step S27, the controller 38 records the dependent RF frequencies in the register 62 in the register-selector unit 40.

The RF power levels obtained in the power tracking process are used in this step.

In step S30, the controller 38 sequentially sets the RF signal generation circuit 42 so that the RF signal generation circuit 42 generates RF signals having the dependent RF frequencies corresponding to the wavelengths of λ1, λ2, ..., λn−1, λn, and supplies the RF signals to the ATOF at the port 5.

Without being influenced by variation of the environment temperature or fluctuation of the intensity of the light source having the reference wavelength, the controller 38 sequentially performs frequency-tracking and power-tracking to optimize the dependent RF frequencies such that the detected value of the RF frequencies, that is, the voltage value of the electrical signal generated in the optical monitor circuit 36 by opto-electrical conversion, become the maximums. With the optimized dependent RF frequencies, the controller 38 updates the dependent RF frequencies and the corresponding RF power levels to be recorded in the register 62.

In step S28, the controller 38 determines whether a request for wavelength selection is received.

When a request of wavelength selection is not received, step S20 through step S27 are repeated.

When a request of wavelength selection is received from a device at an upper level, which includes the wavelength and port to be selected, in step S29, out of the dependent RF frequencies of the wavelengths of λ1, λ2, ..., λn−1, λn and the RF power levels recorded in the register 62, the selector 63 in the register-selector unit 40 selects one dependent RF frequency, and the RF power level, in correspondence to the requested wavelength specified in the wavelength selection request, and records the selected dependent RF frequency and the RF power level in the register 64, which is used for the port specified in the wavelength selection request.

Hence, the register 62 is set while monitoring the wavelengths of λ1, λ2, ..., λn−1, λn in actual use, and it is possible to perform wavelength selection with high precision.

In the above descriptions, steps S21, S22 correspond to the reference RF frequency detection unit, step S25 corresponds to the tracking unit, the register 62 corresponds to the first register, the register 64 corresponds to the second register, steps S26, S27 correspond to the first register recording unit, step S28 corresponds to the repeating unit, step S29 corresponds to the second register recording unit, the combining coupler 46 corresponds to the combining unit.

While the invention is described above with reference to specific embodiments chosen for purpose of illustration, it should be apparent that the invention is not limited to these embodiments, but numerous modifications could be made thereto by those skilled in the art without departing from the basic concept and scope of the invention.

According to the present invention, it is possible to perform high speed wavelength selection and switching. In addition, it is possible to perform optimized and precise wavelength selection.

This patent application is based on Japanese Priority Patent Application No. 2005-049089 filed on Feb. 24, 2005, the entire contents of which are hereby incorporated by reference.

What is claimed is:

1. A wavelength selection control method, comprising the steps of:
    detecting a plurality of reference RF frequencies by varying a frequency of a RF signal supplied to a reference acousto-optic tunable filter, a plurality of reference signals having respective reference wavelengths being input to said reference acousto-optic tunable filter, said reference RF frequencies being in correspondence to the reference wavelengths;
    performing tracking to optimize the reference RF frequencies;
    calculating, from the reference RF frequencies, a plurality of dependent RF frequencies corresponding to wavelengths of a plurality of WDM transmission signals, and recording the calculated dependent RF frequencies in a first register;
    repeating the step of detecting, the step of performing tracking, and the step of calculating and recording when a request for wavelength selection is not received;
    selecting, from the first register, one of the dependent RF frequencies in correspondence to a requested wavelength, and recording the selected dependent RF frequency to in second register when a request of wavelength selection is received, said second register being used for an acousto-optic tunable filter at a port in operation, the WDM transmission signals being supplied to said port in operation; and
    generating a RF signal having the selected dependent RF frequency recorded in the second register, and supplying the RF signal having the selected dependent RF frequency to the acousto-optic tunable filter at the port in operation.

2. The method as claimed in claim 1, wherein
    the WDM transmission signals and the reference signals are combined and supplied to the reference acousto-optic tunable filter; and in the step of performing tracking, the reference RF frequencies and the dependent RF frequencies are optimized.

3. The method as claimed in claim 1, wherein the reference wavelengths include:
   a first reference wavelength that is shorter than the shortest one of the wavelengths of the WDM transmission signals by a quantity equivalent to one channel; and
   a second reference wavelength that is longer than the longest one of the wavelengths of the WDM transmission signals by a quantity equivalent to one channel.

4. A wavelength variable filter device, comprising:
   a reference RF frequency detection unit that detects a plurality of reference RF frequencies by varying a frequency of a RF signal supplied to a reference acousto-optic tunable filter, a plurality of reference signals having respective reference wavelengths being input to said reference acousto-optic tunable filter, said reference RF frequencies being in correspondence to the reference wavelengths;
   a tracking unit that performs tracking to optimize the reference RF frequencies;
   a first register recording unit that calculates a plurality of dependent RF frequencies corresponding to wavelengths of a plurality of WDM transmission signals from the reference RF frequencies, and recording the calculated dependent RF frequencies in a first register;
   a repeating unit that repeats detection of the reference RF frequencies, tracking, and calculation and recording of the dependent RF frequencies when a request of wavelength selection is not received; and
   a second register recording unit that selects, from the first register, one of the dependent RF frequencies in correspondence to the requested wavelength, and records the selected dependent RF frequency in a second register when a request of wavelength selection is received, said second register being used for an acousto-optic tunable filter at a port in operation, the WDM transmission signals being supplied to said port in operation;
   wherein
   a RF signal having the selected dependent RF frequency recorded in the second register is generated and supplied to the acousto-optic tunable filter at the port in operation.

5. The wavelength variable filter device as claimed in claim 4, further comprising:
   a combining unit that combines the WDM transmission signals and the reference signals and supplies the combined signal to the reference acousto-optic tunable filter;
   wherein
   the tracking unit optimizes the reference RF frequencies and the dependent RF frequencies.

6. The wavelength variable filter device as claimed in claim 4, wherein the tracking unit optimizes the reference RF frequencies and RF power levels related to the reference RF frequencies.

7. The wavelength variable filter device as claimed in claim 5, wherein the tracking unit optimizes the reference RF frequencies and RF power levels related to the respective reference RF frequencies, and the dependent RF frequencies and RF power levels related to the dependent RF frequencies.

8. The wavelength variable filter device as claimed in claim 4, wherein the reference wavelengths include:
   a first reference wavelength that is shorter than the shortest one of the wavelengths of the WDM transmission signals by a quantity equivalent to one channel; and
   a second reference wavelength that is longer than the longest one of the wavelengths of the WDM transmission signals by a quantity equivalent to one channel.

* * * * *